United States Patent
Hirakawa et al.

(10) Patent No.: US 6,556,316 B2
(45) Date of Patent: *Apr. 29, 2003

(54) IMAGE READING DEVICE, IMAGE EXPOSURE DEVICE, AND IMAGE RECORDING DEVICE

(75) Inventors: Takashi Hirakawa, Kanagawa (JP); Atsushi Yamazaki, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,922

(22) Filed: Jun. 5, 1998

(65) Prior Publication Data
US 2001/0043373 A1 Nov. 22, 2001

(30) Foreign Application Priority Data
Jun. 16, 1997 (JP) .............................. 9-158543

(51) Int. Cl.$^7$ ................................. H04N 1/04
(52) U.S. Cl. ...................... 358/475; 358/480; 358/484
(58) Field of Search .................. 358/475, 480, 358/482, 483, 484; 382/260, 261, 262, 263, 264, 265; 348/360, 361, 363, 364, 365, 366

(56) References Cited

U.S. PATENT DOCUMENTS

| | | | | |
|---|---|---|---|---|
| 3,981,565 A | * | 9/1976 | Karasawa | 350/266 |
| 4,312,004 A | * | 1/1982 | Samek et al. | 346/108 |
| 4,887,892 A | * | 12/1989 | Bacus | 350/523 |
| 5,134,487 A | * | 7/1992 | Taguchi et al. | 358/209 |
| 5,276,459 A | * | 1/1994 | Danzuka et al. | 346/33 A |
| 5,293,542 A | * | 3/1994 | Ise et al. | 348/363 |
| 5,414,535 A | * | 5/1995 | Kanmoto et al. | 358/487 |
| 5,606,392 A | * | 2/1997 | Tintera et al. | 396/161 |
| 6,356,304 B1 | * | 3/2002 | Kawaguchi et al. | 348/222.1 |

* cited by examiner

*Primary Examiner*—Thomas D. Lee
(74) *Attorney, Agent, or Firm*—Sughrue Mion, PLLC

(57) ABSTRACT

Because the dynamic range of a solid-state image sensor is relatively narrow, it is necessary to reduce the amount of light using an aperture so that the amount of light incident on the solid-state image sensor is within the range of the dynamic range. However, the amount of control at this time may exceed a controllable range which is the maximum limit of an amount in which diffraction is not generated. As a result, the amount of control by the aperture is determined so that the amount of control by the aperture does not exceed the controllable range, and an ND filter, which corresponds to or is approximate to the amount of control of reduced light which was obtained by subtracting the amount of control by the aperture from the total amount of control, is placed on an optical path.

31 Claims, 5 Drawing Sheets

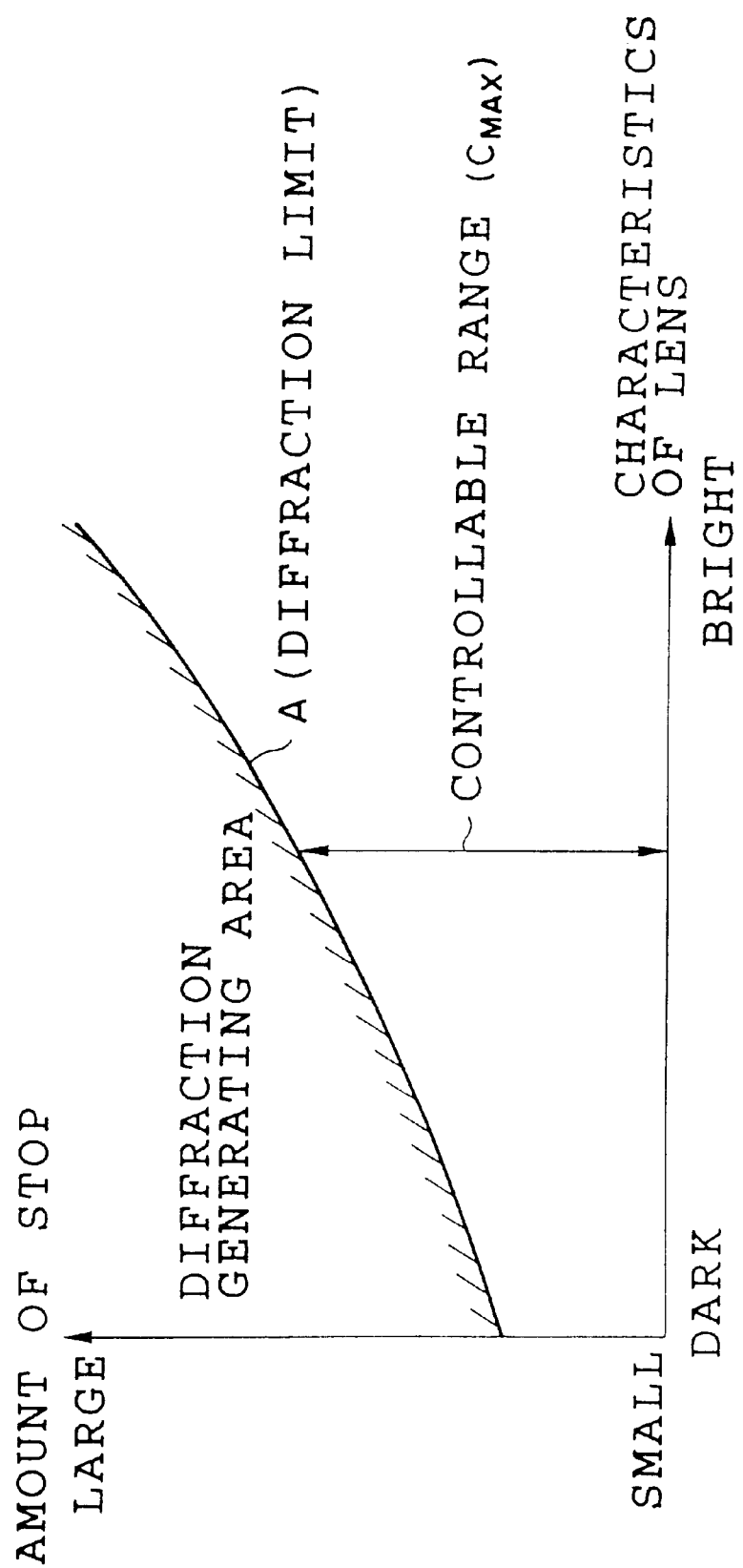

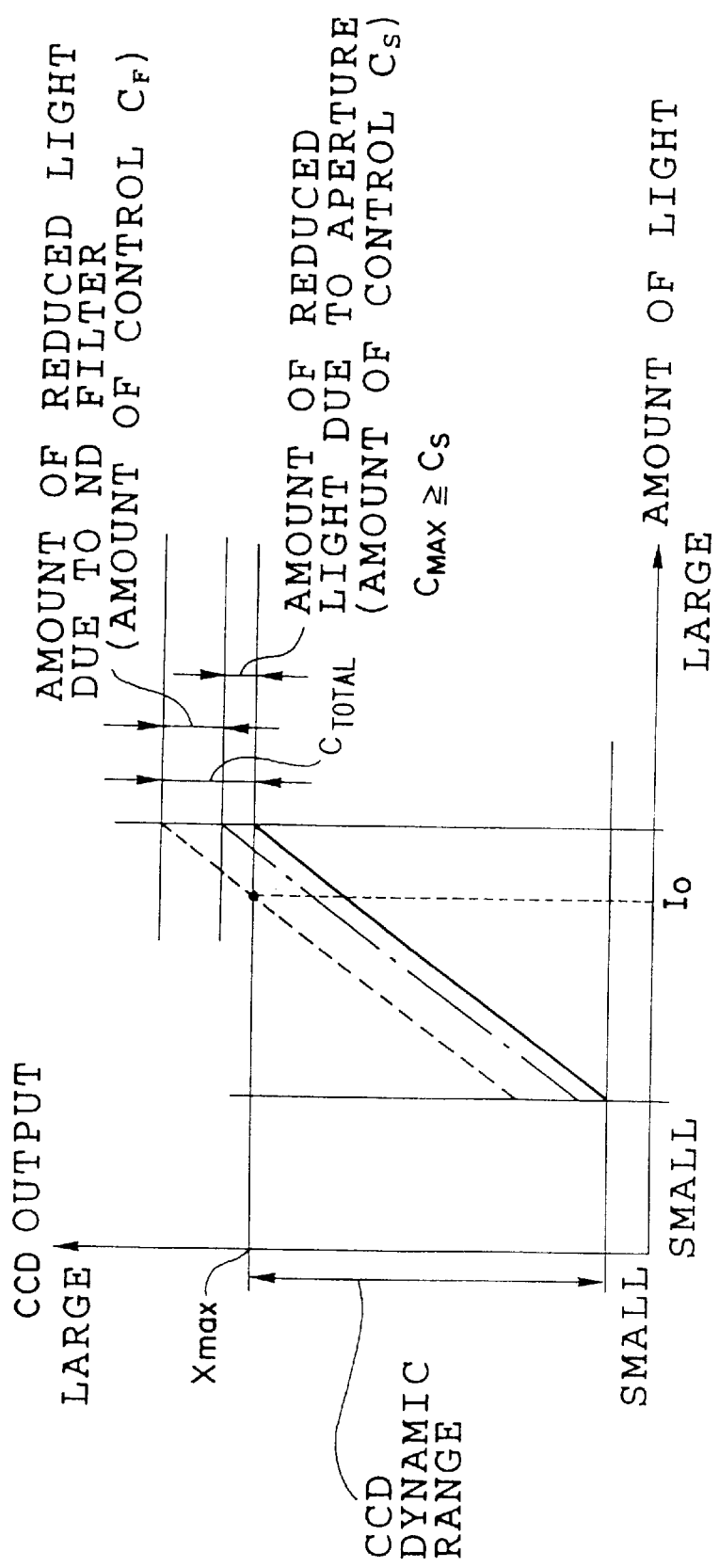

# IMAGE READING DEVICE, IMAGE EXPOSURE DEVICE, AND IMAGE RECORDING DEVICE

BACKGROUND OF THE INVENTION

1. Field of the Invention

The present invention relates to an image reading device in which, when an original image is read by a solid-state image sensor via a lens, a variable aperture mechanism, which is disposed in the vicinity of the lens and can change the amount of light to be adjusted, adjusts the amount of light in the photo-receivable range of the solid-state image sensor.

2. Description of the Related Art

In an image reading optical system in which light is illuminated onto an original image, the reflected or transmitted light is guided to a CCD sensor via a lens, and the image is picked up, an aperture mechanism is disposed on an optical path so as to adjust the amount of light which to reach the CCD sensor.

Further, in case of a color CCD sensor, a color balance filter which adjusts the balance of colors, an IR cut filter which cuts infrared rays, and the like are disposed in the vicinity of the lens. Thus, only the light which is necessary to read an image reaches the CCD sensor.

The above aperture mechanism adjusts the amount of light so that the area of the amount of the above reflected light or transmitted light falls within the dynamic range of the CCD sensor. When the amount of light is great, the amount of obstruction of the optical path is increased, and when the amount of light is small, the optical path is set at full aperture.

The amount of control of the aperture mechanism is determined by the brightness of the lens (the ratio of the amount of irradiated light to the amount of incident light). For example, when the amount of output light is small in comparison to the amount of light incident on the lens, i.e., when a dark lens is used, the amount of control by the aperture mechanism may be restricted due to diffraction limit.

SUMMARY OF THE INVENTION

With the aforementioned in view, an object of the present invention is to obtain an image reading device in which the width of the amount of light to be controlled can be increased without generating drawbacks such as light diffraction or the like.

The first aspect of the present invention is an image reading device in which, when an original image is read by a solid-state image sensor via a lens, a variable aperture mechanism, which is disposed in the vicinity of the lens and can change the amount of light to be adjusted, adjusts the amount of light in the photo-receivable range of the solid-state image sensor, wherein: in a state in which the variable aperture mechanism is stopped substantially in the center of the range in which the amount of light can be adjusted by the variable aperture mechanism, light reducing means is provided so that the output value of the solid-state image sensor corresponding to the maximum amount of light received by the solid-state image sensor is within a predetermined range.

In accordance with the first aspect of the present invention, if the amount of light reflected by the original image or the amount of light transmitted through the original image is large, it is possible that the amount of light is saturated and exceeds the photo-receivable range (dynamic range) of the solid-state image sensor. In this case, the variable aperture mechanism guides the light to the solid-state image sensor in a state in which the amount of light is reduced. At this time, if the amount of light is so-called stopped too much, the amount of light received by each pixel of the solid-state image sensor may be different to the actual original image due to light diffraction. Accordingly, the amount of light is reduced by a predetermined amount beforehand by the light reducing means, and thereafter, the amount of light is adjusted to the optimal level by the variable aperture mechanism.

In this way, it is no longer necessary to stop by the variable aperture mechanism by a large amount and drawbacks such as the light diffraction or the like can be prevented.

Further, even if the variation of the amount of light reflected by the original image or the amount of light transmitted therethrough is large, the light reducing means is provided substantially in the center of the range in which the amount of light received can be adjusted by the variable aperture mechanism, so that the value output by the solid-state image sensor, which corresponds to the maximum amount of light received by the solid-state image sensor, falls within a predetermined range. Consequently, the amount of light can be adjusted over a wide range without generating light diffraction.

Namely, the first invention achieves a superior effect in that the extent of the amount of light to be controlled can be increased without generating drawbacks such as light diffraction or the like.

A second aspect of the present invention is an image reading device in which, when an original image is read by a solid-state image sensor via a lens, a variable aperture mechanism, which is disposed in the vicinity of the lens and can change the amount of light to be adjusted, adjusts the amount of light in the photo-receivable range of the solid-state image sensor, wherein: a separate ND filter reduces the light by a predetermined amount so that diffraction is not generated due to the stop adjustment by the variable aperture mechanism for necessary adjusting the amount of light.

In accordance with the second aspect of the present invention, as the ND filter is used, the amount of light can be reduced without obstructing the optical path. When an ND filter is disposed on the optical path, if the ND filter is removable, an optimal ND filter can be selected for each of the devices. Moreover, if a plurality of ND filters are superposed, the ND filter can implement (gradual) control of the amount of light to a certain extent, and the variable aperture mechanism carries out only fine adjustment.

Namely, in the second aspect of the present invention, the amount of light can be reduced without obstructing the optical path.

A third aspect of the present invention is an image reading device in which, when an original image is read by a solid-state image sensor via a lens, a variable aperture mechanism, which is disposed in the vicinity of the lens and can change the amount of light to be adjusted, adjusts the amount of light in the photo-receivable range of the solid-state image sensor, wherein: a separate fixed aperture mechanism, in which the amount of light to be adjusted is fixed, reduces a predetermined amount of light so that diffraction is not generated due to the stop adjustment by the variable aperture mechanism for necessary adjusting the amount of light.

In accordance with the third aspect of the present invention, as the two aperture mechanisms (the variable aperture mechanism and the fixed aperture mechanism) are used, the amount of stop can be dispersed and drawbacks such as diffraction or the like can be prevented.

Namely, in the third aspect of the present invention, the amount of stop can be dispersed and drawbacks such as diffraction or the like can be prevented.

BRIEF DESCRIPTION OF THE DRAWINGS

FIG. 3 is a characteristic view which shows the relationship between the brightness of a lens and the amount of stop.

FIG. 4 is a characteristic view which shows the relationship between the amount of light and the output of a CCD line sensor.

DESCRIPTION OF THE PREFERRED EMBODIMENTS

Figure 1:
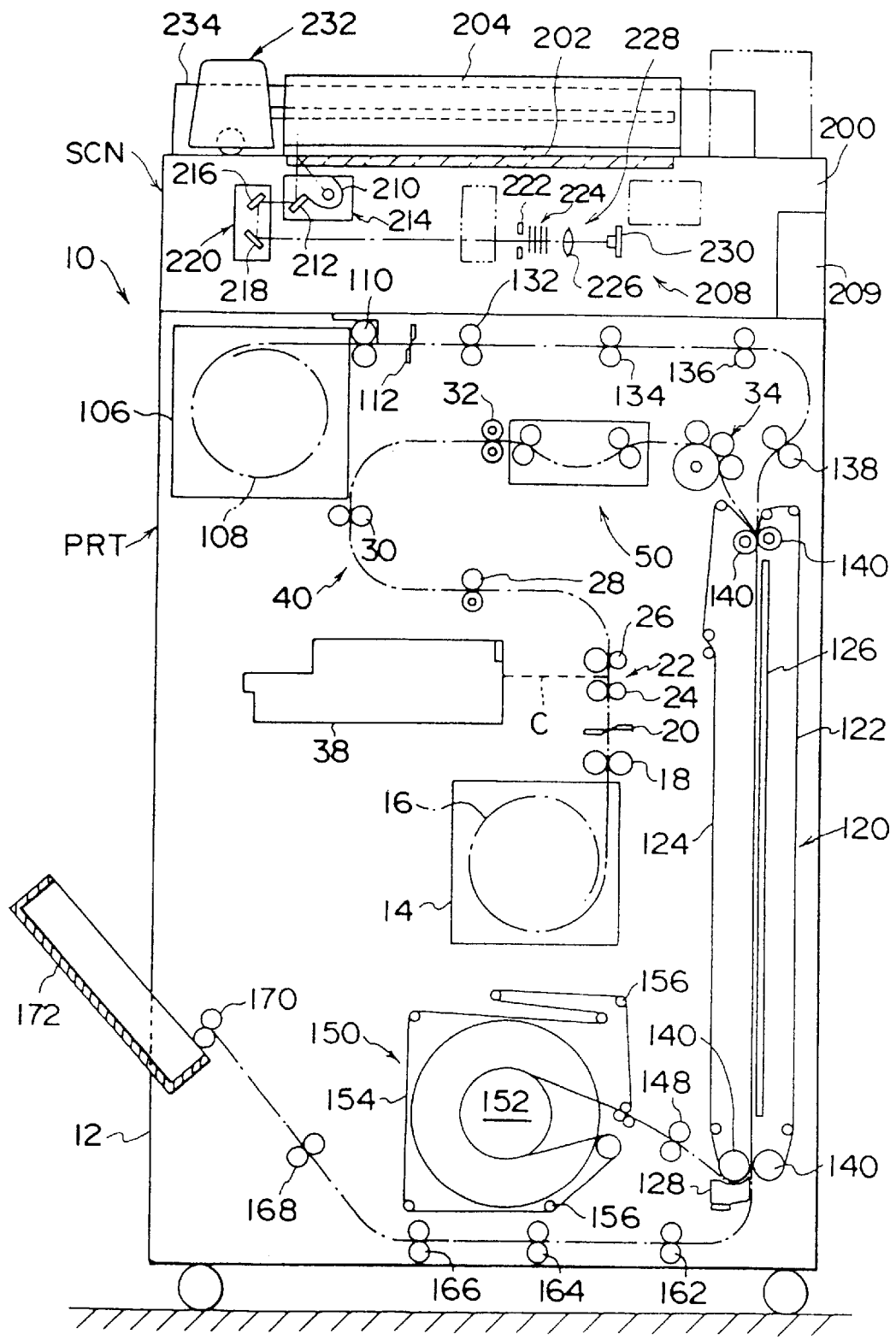
FIG. 1 is a schematic overall structural view of an image reading/recording device relating to a present embodiment.

FIG. 1 shows a schematic overall structural view of an image reading/recording device 10 relating to an embodiment of the present invention.

The image reading/recording device 10 comprises a scanner section SCN (image reading device) which serves as an image reading section and a printer section PRT (image exposure device and image recording device) which records an image. The scanner section SCN is provided on a machine stand 12, and the printer section PRT is provided therewithin.

(Scanner Section SCN)

FIG. 1 shows the scanner section SCN relating to the present embodiment.

The scanner section SCN is covered by a box-shaped casing 200. A rectangular opening portion is provided on the upper surface central portion of the casing 200 so that a transparent platen glass 202 is fit into the opening portion. The platen glass 202 has a function of a flat original disposing stand, and an original, onto which a flat image has been recorded, is disposed on the platen glass 202 facing downwardly.

A presser cover 204, which can be opened and closed, is provided on the platen glass 202. The presser cover 204 is engaged with the casing 200 by a hinge in the innermost side thereof and is rotatable around the hinge.

Accordingly, in a state in which the presser cover 204 is closed, the original can be pressed and held from above towards the platen glass 202.

An unillustrated operation/display panel is provided at the upper surface front side of the casing 200 in such a way that designations of various functions, display of an operation state within the device, or the like are performed.

A scanning portion 208 is provided within the casing 200. The scanning portion 208 is controlled by a controller 209. The scanning portion 208 comprises a first carriage 214, a second carriage 220, and a fixed unit 228. The first carriage 214 includes a light source 210 and a first mirror. The light source 210 has a halogen lump and a reflector which are extended in the transverse direction (the main scanning direction) of an original image. The first mirror 212 is extended in the transverse direction of the original image along with the light source 210. The second carriage 220 includes a second mirror 216 and a third mirror 218. A fixed unit 228 comprises an aperture 222, a filter group 224 formed by four filters such as a color adjustment filter 224A, an ND filter 224B, or the like (see FIG. 2), and a lens 226 for forming an image.

In the first carriage 214, the light from the light source 210 is illuminated onto an original disposed on the surface of the platen glass 202, and the reflected light (the light of the dropping optical axis) is deflected at 90° by the first mirror 212 and guided to the second mirror 216 in the second carriage 220.

In the second carriage 220, the reflecting surface of the second mirror 216 opposes and is parallel to the above-described first mirror 212. When the second carriage 220 receives light from the first mirror 212, the light is deflected at 90° by the first mirror 212 and is further deflected at 90° by the third mirror 218.

The light, which is made parallel to the surface of the platen glass 202 at last by the third mirror 218, passes through the fixed unit 228 and reaches the light-receiving portion of a CCD line sensor 230 (solid-state image sensor). The light-receiving portion of the CCD line sensor 230 of the present embodiment comprises three lines which separately detect the amount of received light for every color (R, G, B).

Figure 2:
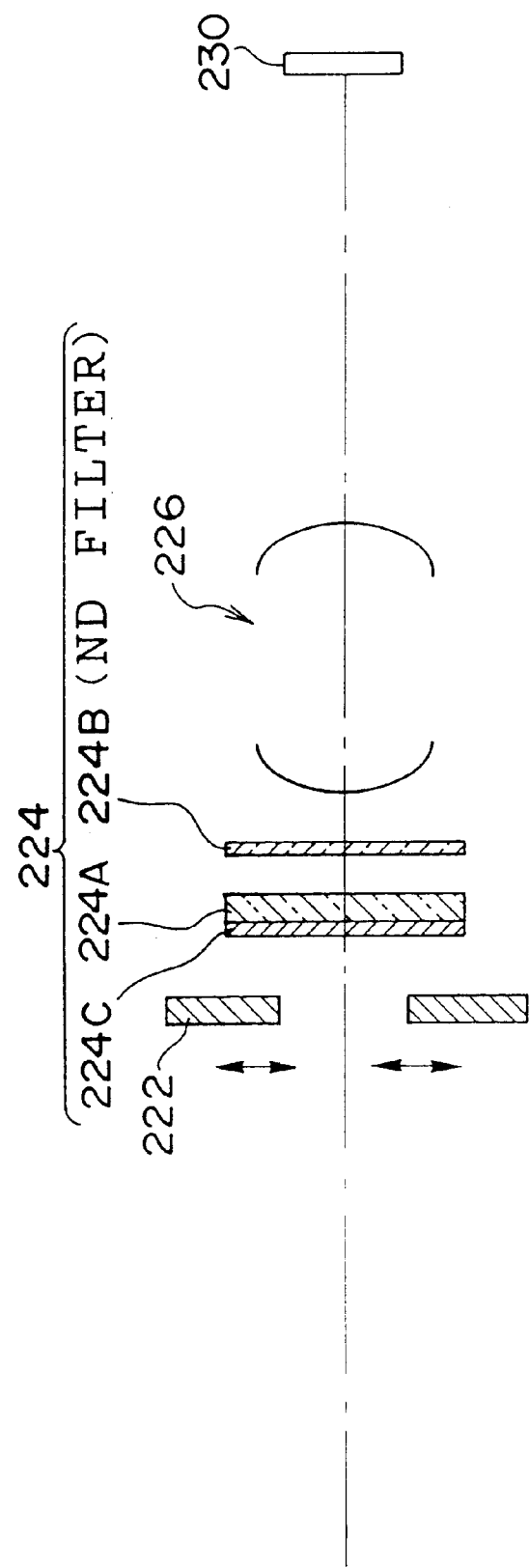
FIG. 2 is an enlarged side view of the vicinity of a fixed unit relating to the present embodiment.

As shown in FIG. 2, in the fixed unit 228, the amount of light is adjusted (to be described later) by the aperture 222 (variable aperture mechanism) or the ND filter 224B (light reducing means, light reducer) of the filter group 224, and the balance of the respective colors is adjusted by the color adjustment filter 224A of the filter group 224. Further, the original image is formed on the light-receiving surface of the CCD line sensor 230 by the lens 226. An IR cut membrane 224C corresponding to an IR cut filter is deposited on the surface of the color adjustment filter 224A.

FIG. 3 shows the relationship between the brightness of the lens 226 and the amount of stop of the aperture 222.

As shown in FIG. 3, the darker the brightness of the lens 226, the smaller the amount of stop of the aperture 222 which reaches the diffraction limit line (see curve A in FIG. 3). As a result, it is found that the range of control by the aperture 222 becomes narrow.

If the aperture 222 is stopped over the above-described diffraction limit A (the amount of stop is large), optimal light does not reach the CCD line sensor 226 due to light diffraction and the image cannot be read accurately. As a result, when the lens 226 is dark, the controllable range $C_{MAX}$ by the aperture 222 is narrow, and when the lens 226 is bright, the range is wide.

FIG. 4 shows the relationship between the amount of light (the amount of light reflected by the original (the amount of uncontrolled light)) and the output value of the CCD line sensor 226. In the CCD line sensor 226, the dynamic range (the range (proportionate range) of the amount of incident light in which the amount of output is in proportion to the amount of incident light) is relatively narrow, and in the case of the distribution of the amount of light shown by the chain line in FIG. 4, an (saturated) area which cannot be read exists. Namely, when the amount of light is $I_0$ or more, the output of the CCD line sensor 226 is a constant value $X_{max}$.

Consequently, it is necessary to stop (control) the amount of light (the amount of uncontrolled light) corresponding to the chain line in FIG. 4 by the aperture 222 until the relationship between the amount of light (the amount of controlled light) incident on the CCD line sensor 226 and the output of the CCD line sensor 226 becomes the one shown by the solid line in FIG. 4. However, the amount of control at this time becomes $C_{TOTAL}$ ($=C_F+C_S$) and may exceed the above-described controllable range $C_{MAX}$. As a result, the amount of control $C_F$, in which the amount of control by the aperture 222 does not exceed the controllable range $C_{MAX}$ ($C_{MAX} \geq C_S$), is determined, and the ND filter 224B, in which the amount of control of reduced light coincides with or is approximate to the amount of control $C_F$, is placed on the optical path.

In this way, as the means of reducing the amount of light is formed by two stages (the aperture 222 and the ND filter 224), the amount of control $C_S$ by the aperture 222 can be included in the controllable range $C_{MAX}$.

The first carriage 214 and the second carriage 220 of the scanning portion 208 reciprocally move in the sub-scanning direction below the platen glass 202 along the original surface. At this time, in order to invariably maintain the constant optical path length from an original reflected position to the light-receiving portion of the CCD line sensor 230, the second carriage 220 moves in the direction which is the same as that of the first carriage 214 at a conveying speed which is half of the conveying speed thereof. One reciprocal movement of the first carriage 214 and the second carriage 220 is the scanning of one image (an image is read on the outward journey). In this way, the original image on the platen glass 202 can be read.

A light source unit 232 for proof, which moves on the platen glass 202 in the main scanning direction with a clearance therebetween, is provided on the upper surface of the casing 200. The light source unit 232 for proof is used as a light source when a transmitted original is disposed on the platen glass 202.

Namely, the one end portion (the innermost side of the device) of the light source unit 232 for proof is connected to a light source unit driving portion 234. Due to the driving force of the light source unit driving portion 234, the light source unit 232 for proof carries out the same operation as that of the above first carriage 214.

When the transmitted original is scanned, the light source unit 232 for proof operates taking synchronism with the first carriage 214. At this time, the light source 210 in the first carriage 214 is turned off. As a light source (unillustrated) within the light source unit 232 for proof is turned on, the transmitted original image can be obtained by the first mirror 212. The subsequent operations are the same as those of the reflected original.

As described hereinbefore, the scanning portion 208 and the light source unit 232 for proof forms a photometry portion of the present invention.

(Printer Section PRT)

FIGS. 1 and 2 show the printer section PRT within the machine stand 12 of the image reading/recording device 10.

A photosensitive material magazine 14, which accommodates a photosensitive material 16, is disposed within the machine stand 12. The photosensitive material 16 is taken up onto the photosensitive material magazine 14 in a roll form so that the photosensitive (exposed) surface of the photosensitive material 16, which has been withdrawn from the photosensitive material magazine 14, faces the left-hand side.

A nip roller pair 18 and a cutter 20 are disposed in the vicinity of a photosensitive material removal port of the photosensitive material magazine 14. A predetermined length of the photosensitive material 16 is withdrawn from the photosensitive material magazine 14, and thereafter, the photosensitive material 16 is cut. The cutter 20 is, for example, a rotary type cutter formed by a fixed blade and a moving blade, and as the moving blade is moved upwardly and downwardly by a rotational cam or the like and is engaged with the fixed blade, the photosensitive material 16 can be cut.

A plurality of conveying rollers 24, 26, 28, 30, 32, and 34 are disposed on the side of the cutter in that order, and an unillustrated guide plate is disposed between the respective conveying rollers. The photosensitive material 16, which has been cut to the predetermined length, is at first conveyed to an exposure portion 22 provided between the conveying roller pairs 24 and 26.

An exposure device 38 is provided on the left side of the exposure portion 22. Three types of LDs (laser diodes), a lens unit, a polygon mirror, a mirror unit (all of them are unillustrated) are disposed in the exposure device 38. Ray C is transmitted from the exposure device 38 to the exposure portion 22 and the photosensitive material 16 is exposed (a laser beam from each of the LDs is scanned by the polygon mirror like a pendulum and the photosensitive material 16 is exposed).

Instead of using a structure in which the laser beam from the LD is scanned by the polygon mirror like a pendulum, a structure in which LEDs are arranged in the main scanning direction and one line of the LEDs is exposed simultaneously may be used.

Further, a U-turn portion 40, which bends and conveys the photosensitive material 16 in the shape of a U, and a water application portion 50 for applying solvent for forming an image are provided above the exposure portion 22. In the present embodiment, water is used as the solvent for forming an image.

The photosensitive material 16, which has been raised from the photosensitive material magazine 14 and exposed at the exposure portion 22, is nipped and conveyed by the conveying roller pairs 28, 30. Then, the photosensitive material 16 passes a conveying path at the upper side of the U-turn portion 40 and is conveyed to the water application portion 50.

On the other hand, as shown in FIG. 1, an image receiving material magazine 106 which accommodates an image receiving material 108 is disposed at the upper left end portion of the machine stand 12. A dye fixing material having mordant is applied to the image forming surface of the image receiving material 108. The image receiving material 108 is taken up onto the image receiving material magazine 106 in a roll form so that the image forming surface of the image receiving material 108, which has been withdrawn from the image receiving material magazine 106, faces downward.

A nip roller pair 110 is disposed in the vicinity of the image receiving material removal port of the image receiving material magazine 106. The nip roller pair 110 can withdraw the image receiving material 108 from the image receiving material magazine 106 and release the nipping of the image receiving material 108.

A cutter 112 is disposed on the side of the nip roller pair 110. Similar to the aforementioned cutter 20 for the photosensitive material, the cutter 112 is, for example, a rotary type cutter formed by a fixed blade and a moving blade, and as the moving blade is moved upward and downward by a rotational cam or the like and is engaged with the fixed blade, the image receiving material 108 can be cut to the length which is shorter than that of the photosensitive material 16.

On the side of the cutter 112, conveying roller pairs 132, 134, 136, and 138 and unillustrated guide plates are disposed in such a way that the image receiving material 108, which has been cut to a predetermined length, can be conveyed to a heat development transfer portion 120 side.

As shown in FIG. 1, the heat development transfer portion 120 has a pair of loop-shaped endless belts 122 and 124. The pair of endless belts 122 and 124 are trained around a plurality of training rollers 140 and the vertical direction in FIG. 1 is the longitudinal direction of the endless belts 122 and 124. Accordingly, when any of these training rollers 140 is driven to rotate, the pair of endless belts 122 and 124, which have been trained around these training rollers 140, are rotated respectively.

Within the loop of the endless belt 122, which is on the upper right-hand side in FIG. 1, of the pair of endless belts 122 and 124, a heating plate 126, which is formed in the shape of a flat plate and whose vertical direction is the longitudinal direction, is disposed so as to oppose the inner circumferential portion of the endless belt 122 on the left-hand side. An unillustrated linear heater is disposed within the heating plate 126, so that temperature of the surface of the heating plate 126 is increased by the heater and the heating plate 126 can be heated at predetermined temperature.

Consequently, the photosensitive material 16 is conveyed between the pair of endless belts 122 and 124 of the heat development transfer portion 120 by the last conveying rollers 34 on the conveying path. Moreover, the image receiving material 108 is conveyed in synchronism with the conveyance of the photosensitive material 16. In a state in which the predetermined length of the photosensitive material 16 is advanced, the image receiving material 108 is conveyed between the pair of endless belts 122 and 124 of the heat development transfer portion 120 by the last conveying roller pair 138 on the conveying path. Thereafter, the image receiving material 108 and the photosensitive material 16 are superposed.

In this case, because the longitudinal dimensions and transverse dimensions of the image receiving material 108 are shorter than those of the photosensitive material 16, the photosensitive material 16 is laminated onto the image receiving material 108 with all four sides of the periphery of the photosensitive material 16 projecting beyond the periphery of the image receiving material 108.

As described above, the photosensitive material 16 and the image receiving material 108, which have been laminated by the pair of endless belts 122 and 124, are nipped and conveyed by the pair of endless belts 122 and 124 in a laminated state. Further, when the laminated photosensitive material 16 and the image receiving material 108 are completely accommodated between the pair of endless belts 122 and 124, the rotation of the pair of endless belts 122 and 124 is stopped temporarily and the nipped photosensitive material 16 and the image receiving material 108 are heated by the heating plate 126. The photosensitive material 16 is heated by the heating plate 126 via the endless belt 122 while the photosensitive material 16 is nipped/conveyed and stopped. As the photosensitive material 16 is heated, a movable dye is discharged, and at the same time, the dye is transferred onto the dye fixing layer of the image receiving material 108. An image is thereby obtained on the image receiving material 108.

Further, a peeling pawl 128 is disposed at the downstream side in the direction in which the materials are supplied of the pair of endless belts 122 and 124. Of the photosensitive material 16 and the image receiving material 108 which are nipped and conveyed between the pair of endless belts 122 and 124, the peeling pawl 128 engages the leading end portion of only the photosensitive material 16. The peeling pawl 128 peels the leading end portion of the photosensitive material 16 protruded from the pair of endless belts 122 and 124 from the image receiving material 108.

A photosensitive material discharge roller pair 148 is disposed on the left-hand side of the peeling pawl 128. The photosensitive material discharge roller pair 148 conveys the photosensitive material 16, which is guided by the peeling pawl 128 and moved to the left, towards a discharged photosensitive material accommodating portion 150.

The discharged photosensitive material accommodating portion 150 has a drum 152, around which the photosensitive material 16 is wound, and a belt 154, of which portion is trained around the drum 152. Further, the belt 154 is trained around a plurality of rollers 156. The belt 154 is driven due to the rotation of the rollers 156 and the drum 152 is rotated accordingly.

Consequently, when the photosensitive material 16 is conveyed in a state in which the belt 154 is driven due to the rotation of the rollers 156, the photosensitive material 16 can be stacked around the drum 152.

On the other hand, as shown in FIG. 1, image receiving material discharge roller pairs 162, 164, 166, 168, and 170 are disposed in that order so that the image receiving material 108 can be conveyed to the left from the lower side of the pair of endless belts 122, 124. The image receiving material 108, which has been discharged from the pair of endless belts 122 and 124, is conveyed by the image receiving material discharge roller pairs 162, 164, 166, 168, and 170 and discharged to a tray 172.

The operation of the present embodiment will be explained hereinafter.

Firstly, a description will be given of the reading control of an original image in the scanner section SCN.

The original is disposed on the surface of the platen glass 202. When the presser cover 204 is closed and the starting of reading is designated by the key operation of the operation/display panel, scanning is started. In the scanning, the amount of light incident on the CCD line sensor 230 is adjusted so as to be within the dynamic range of the CCD line sensor 230, i.e., the minimum density area can be reliably read and is not saturated.

The adjustment is effected by the stop control of the aperture 222. However, the amount of control ($C_{TOTAL}$ in FIG. 4) may exceed the diffraction limit due to the characteristics of the lens 226.

Accordingly, the controllable range $C_{MAX}$ by the aperture 222 is obtained beforehand from the relationship between the brightness of the lens 226 and the amount of stop of the aperture 222 in FIG. 3, and the amount of control $C_F$, in which the amount of control $C_S$ by the above-described aperture 222 does not exceed the controllable range $C_{MAX}$ in FIG. 4, is obtained. Namely, for example, the amount of control $C_S$ is set substantially to the center of the obtained controllable range $C_{MAX}$ and the amount of control $C_F$ ($C_{TOTAL}-C_S$) is obtained from the amount of control $C_S$ and the amount of control $C_{TOTAL}$. In this way, even when the amount of reflected light or transmitted light of the original image varies greatly, light diffraction does not occur and the amount of light can be adjusted over a wide range.

Thereafter, the ND filter 224B, in which the amount of control of reduced light corresponds to or is approximate to the amount of control $C_F$, is placed on the optical path. Accordingly, the amount of control of the aperture 222 can be included in the controllable rage $C_{MAX}$.

The amount of control $C_F$ is different based on the light source, the state of degradation of the light source, the state of assembly of the device, the machine error, variations in brightness at the time of manufacturing of the lens, or the like. However, if the difference between the controllable range $C_{MAX}$ and the amount of control $C_S$ of the aperture 222 ($C_{MAX}-C_S$) is set to be large, it is not necessary to replace the ND filter 224B for every device and the specific ND filter 224B may be placed in advance. Additionally, when the ND filter is disposed on the optical path, the ND filter may be removable. In this way, an optimal ND filter can be selected for each device. Further, a plurality of ND filters may be superposed. In this way, the ND filter can implement (gradual) control of amount of light to a certain extent, and the variable aperture mechanism effects only fine adjustment.

After the above-described adjustment, in the case of a reflected original, the light source 210 is turned on, and the first carriage 214 and the second carriage 220 are synchronized so as to start the operation. At this time, the relationship between the conveying speed $V_1$ of the first carriage 214 and the conveying speed $V_2$ of the second carriage 220 is $V_1=2V_2$. By maintaining this relationship, the optical path length from the surface of the original image to the light-receiving surface of the CCD line sensor 230 can be invariably kept constant.

The image data is recorded onto RAM memory or a hard disk in a personal computer or the like. The image data is subjected to predetermined image processing, and thereafter, sent to the printer section PRT.

Figure 5A:
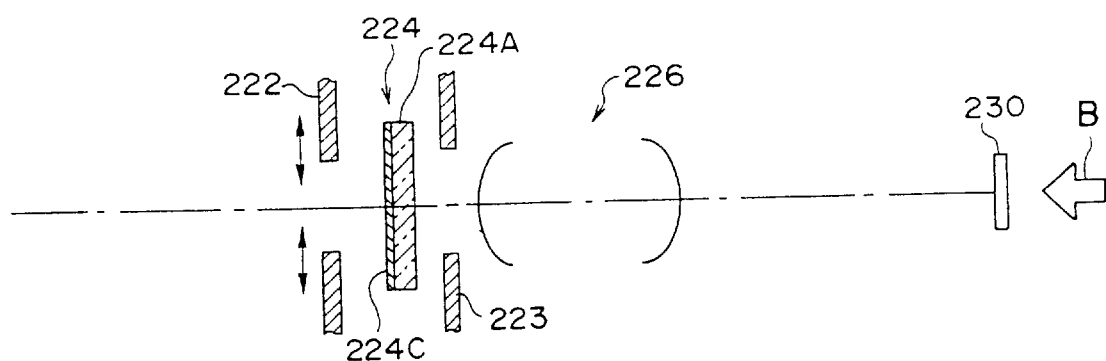
FIG. 5A and 5B are an enlarged view of the vicinity of a fixed unit relating to a variant example.
Figure 5B:
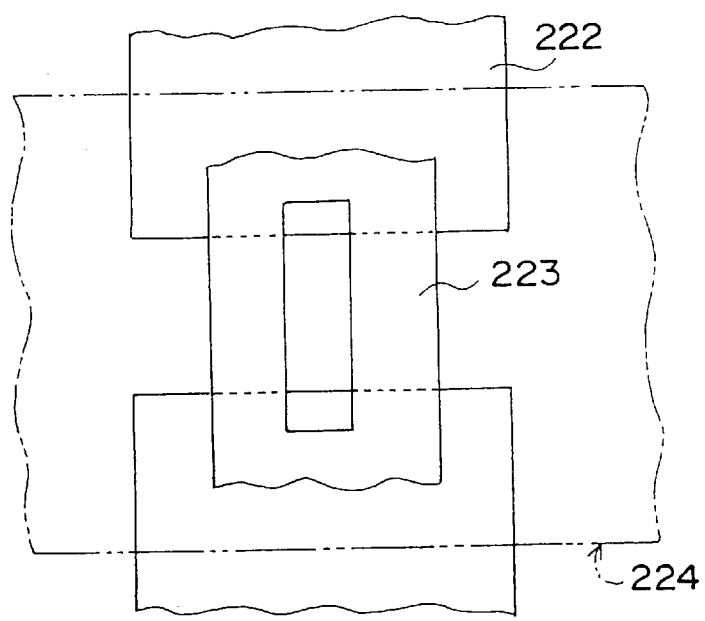

In the above description, the aperture 222 and the ND filter 224B are disposed on the optical path and the reduction of light is effected in two stages. However, as shown in FIG. 5, another aperture 223 may be disposed separately from the aperture 222. In this case, it suffices if the aperture 223 is a fixed aperture. Because the amount of stop can be dispersed even by the two apertures 222 and 223, the same effects as those of the present embodiment can be obtained.

Next, the operation of the printer section PRT will be explained.

After the photosensitive material magazine 14 is loaded, the nip roller pair 18 is operated and the photosensitive material 16 is withdrawn from the photosensitive material magazine 14 by the nip roller pair 18. When the predetermined length of the photosensitive material 16 is withdrawn, the cutter 20 is operated and the photosensitive material 16 is cut to the predetermined length. The photosensitive material 16 is conveyed to the exposure portion 22 in a state in which the photosensitive (exposed) surface faces to the left. Then, the exposure device 38 operates at the same time that the photosensitive material 16 passes through the exposure portion 22, and the image is scan-exposed onto the photosensitive material 16 disposed at the exposure portion 22. The image data read by the aforementioned scanner section SCN is subjected to image processing by the personal computer and is input to the exposure device 38. The amount of light of the light source is controlled on the basis of the input data and the image is scan-exposed. If a laser (semiconductor laser) is used as the light source, the main scanning is effected by reciprocally moving the optical axis of the laser beam, in which the amount of light has been controlled by duty control, like a pendulum and the sub-scanning is effected by moving the photosensitive material 16.

Further, in a case in which the LEDs or the like are arranged in the main scanning direction and the LED array is used as the light source, the current or the voltage of the LED light source is controlled so as to control the amount of light and one main scanning is effected simultaneously.

When the exposure is finished, the exposed photosensitive material 16 is conveyed to the water application portion 50. The photosensitive material 16, to which water serving as solvent for forming an image is applied in the water application portion 50, is conveyed between the pair of endless belts 122 and 124 of the heat development transfer portion 120 by the conveying rollers 34.

On the other hand, as the photosensitive material 16 is scan-exposed, the image receiving material 108 is also withdrawn and conveyed from the image receiving material magazine 106 by the nip roller pair 110. When the predetermined length of the image receiving material 108 is withdrawn, the cutter 112 operates and the image receiving material 108 is cut to the predetermined length.

After the operation of the cutter 112, the cut image receiving material 108 is conveyed by the conveying roller pairs 132, 134, 136, and 138 while the image receiving material 108 is guided by the guide plates. When the leading end portion of the image receiving material 108 is nipped by the conveying roller pair 138, the image receiving material 108 is in a standby state immediately before the heat development transfer portion 120.

Then, as the photosensitive material 16 is conveyed between the pair of endless belts 122 and 124 by the conveying rollers 34 as mentioned above, the conveyance of the image receiving material 108 is resumed and the image receiving material 108 is integrally conveyed with the photosensitive material 16 between the pair of endless belts 122 and 124.

As a result, the photosensitive material 16 and the image receiving material 108 are superposed and nipped/conveyed while they are heated by the heating plate 126. The photosensitive material 16 and the image receiving material 108 are subjected to heat development transfer and an image is thereby formed on the image receiving material 108.

Moreover, when the photosensitive material 16 and the image receiving material 108 are discharged from the pair of endless belts 122 and 124, the peeling pawl 128 engages the leading end portion of the photosensitive material 16, which is conveyed in advance of the image receiving material 108 by a predetermined length, and the leading end portion of the photosensitive material 16 is peeled from the image receiving material 108. The photosensitive material 16 is further conveyed by the photosensitive material discharge roller pair 148 and stacked in the discharged photosensitive material accommodating portion 150. At this time, because the photosensitive material 16 dries quickly, there is no need to provide a new heater or the like for drying the photosensitive material 16.

On the other hand, the image receiving material 108, which has been separated from the photosensitive material 16, is conveyed by the image receiving material discharge roller pairs 162, 164, 166, 168, and 170 and discharged to the tray 172.

When a plurality of photosensitive materials 16 and image receiving materials 108 are subjected to image recording processing, the above processes are effected successively and continuously.

In this way, the image receiving material 108, which has been subjected to heat development transfer processing between the pair of endless belts 122 and 124 and onto which a predetermined image has been formed(recorded), is discharged by the pair of endless belts 122, 124. Thereafter, the image receiving material 108 is nipped and conveyed by the plurality of image receiving material discharge roller pairs 162, 164, 166, 168, and 170 and discharged to the tray 172 at the outer side of the device.

What is claimed is:

1. An image reading device comprising:

a lens;

a solid-state image sensor which reads an original image via said lens;

a variable aperture mechanism having an aperture which is adjustable over an aperture range which is operative to change an amount of light transmitted to said solid-state image sensor from the original; and a light reducing means which reduces light transmitted to the solid-state image sensor from the original, wherein the magnitude of said aperture range is dependent on the light reducing level of said light reducing means and on said lens such that an amount of light reduced by diffraction of the light passing through said aperture is below a predetermined value, the size of the aperture being increased as the light reducing level increases, wherein said aperture range is defined by a characteristic of said lens, said characteristic of said lens being a ratio of incident light to said lens and irradiated light from said lens.

2. An image reading device according to claim 1, wherein said solid-state image sensor is a CCD element and the photo-receivable range is a dynamic range.

3. An image reading device according to claim 1, further comprising:

a photometry portion which photometrically measures light reflected by the original and light transmitted through the original selectively.

4. An image exposure device in which a photosensitive material is exposed so that an image is formed on the basis of the image data of the original image which has been read by the image reading device according to claim 1.

5. An image recording device in which an image, which has been obtained on the photosensitive material due to the exposure of the image exposure device according to claim 4, is transferred and recorded onto an image receiving material.

6. The image reading device of claim 1, wherein said light reducing means is an ND filter that is positioned in the light path, from a position outside the light path.

7. The image reading device of claim 1, wherein said variable aperture mechanism is independently movable from said light reducing means.

8. The image reading device of claim 1, wherein the light reducing level of said light reducing means is determined in accordance with said magnitude of said aperture range.

9. The image reading device of claim 1, wherein said light that is transmitted through the variable aperture mechanism enters into said light reducing means.

10. An image reading device comprising:

a lens;

a solid-state image sensor which reads an original image via said lens;

a variable aperture mechanism which is operative to change an amount of light transmitted to said solid-state image sensor from the original; and a light reducer which reduces light transmitted to the solid-state image sensor from the original;

wherein an opening of said variable aperture mechanism is positioned in such a range that the light passing through said opening to said image sensor experiences minimal diffraction such that the light can be accurately detected by said image sensor, and said light reducer reduces light by CF which is an amount obtained by the following formula, $C_F = C_{TOTAL} - C_S$ $C_S$ is an amount of light reduced by said variable aperture mechanism, and $C_{TOTAL}$ is a total amount of light which is required to be reduced by said variable aperture mechanism and said light reducer so that an amount of light output from said solid-state image sensor is proportional to an amount of light transmitted to the solid-state image sensor, wherein said range is defined by a characteristic of said lens, said characteristic of said lens being a ratio of incident light to said lens and irradiated light from said lens.

11. An image reading device according to claim 10, wherein said light reducer is one of an ND filter and a fixed aperture mechanism in which the amount of light to be adjusted is fixed.

12. An image reading device according to claim 11, wherein the ND filter is attached so as to be removable.

13. An image reading device according to claim 10, wherein said light reducer includes a plurality of ND filters, at least one of the plurality of ND filters is selectively used so as to adjust the amount of light, and said variable aperture mechanism effects fine adjustment.

14. An image reading device according to claim 10, wherein the necessary adjustment of the amount of light is an adjustment of an amount of light in which the amount of light incident on said solid-state image sensor is adjusted to a proportional range of the amount of incident light in which the amount of light incident on said solid-state image sensor is in proportion to the output amount of the solid-state images.

15. An image reading device according to claim 10, further comprising:

a photometry portion which photometrically measures light reflected by the original and light transmitted through the original selectively.

16. An image reading device according to claim 10, wherein said solid-state image sensor is a CCD element and the photo-receivable range is a dynamic range.

17. An image exposure device in which a photosensitive material is exposed so that an image is formed on the basis of the image data of the original image which has been read by the image reading device according to claim 10.

18. An image recording device in which an image, which has been obtained on the photosensitive material due to the exposure of the image exposure device according to claim 17, is transferred and recorded onto an image receiving material.

19. The image reading device of claim 10, wherein said variable aperture mechanism is independently movable from said light reducer.

20. The image reading device of claim 10, wherein said light that is transmitted through the variable aperture mechanism enters into said light reducer.

21. An image reading device comprising:

a lens;

a solid-state image sensor which reads an original image via said lens; and an adjusting portion which adjusts an amount of light incident on said solid-state image sensor from the original image so that an amount of light output from said solid-state image sensor is proportional to an amount of light transmitted to the solid-state image sensor, wherein said adjusting portion includes at least one variable aperture mechanism which is positioned in a range where diffraction is minimized in light which passes through said variable aperture mechanism, wherein said range is defined by a characteristic of said lens, said characteristic of said lens being a ratio of incident light to said lens and irradiated light from said lens.

22. An image reading device according to claim 21, wherein said adjusting portion further includes a light reducer which reduces the amount of light so that the amount of light to be adjusted by said variable aperture mechanism is smaller than or equal to the amount of light to be adjusted in which diffraction is generated.

23. An image reading device according to claim 22, wherein said light reducer is one of an ND filter and a fixed aperture mechanism in which the amount of light to be adjusted is fixed and is smaller than the amount of light to be adjusted in which diffraction is generated.

24. An image reading device according to claim 23, wherein the ND filter is attached so as to be removable.

25. The image reading device of claim 22, wherein said variable aperture mechanism is independently movable from said light reducer.

26. An image reading device according to claim 21, wherein said light reducer includes a plurality of ND filters, at least one of the plurality of ND filters is selectively used so as to adjust the amount of light, and said variable aperture mechanism effects fine adjustment.

27. An image reading device according to claim 21, wherein in a state in which said variable aperture mechanism is stopped substantially in the center of the range in which the amount of light can be adjusted, the amount of light incident on said solid-state image sensor is adjusted to the proportional range.

28. An image reading device according to claim 21, further comprising:
a photometry portion which photometrically measures light reflected by the original and light transmitted through the original selectively.

29. An image reading device according to claim 21, wherein said solid-state image sensor is a CCD element and the photo-receivable range is a dynamic range.

30. An image exposure device in which a photosensitive material is exposed so that an image is formed on the basis of the image data of the original image which has been read by the image reading device according to claim 21.

31. An image recording device in which an image, which has been obtained on the photosensitive material due to the exposure of the image exposure device according to claim 30, is transferred and recorded onto an image receiving material.

* * * * *